United States Patent
Satoh et al.

(10) Patent No.: US 6,473,678 B1
(45) Date of Patent: Oct. 29, 2002

(54) LATERAL CONTROL OF VEHICLE FOR LANE FOLLOWING

(75) Inventors: Shigeki Satoh; Kenya Uenuma, both of Kanagawa; Hiroshi Mouri, Yokohama; Hiroyuki Furusho; Masayasu Shimakage, both of Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/628,686

(22) Filed: Jul. 28, 2000

(30) Foreign Application Priority Data

Aug. 2, 1999 (JP) .......................................... 11-219171

(51) Int. Cl.$^7$ .............................. B60J 8/32; G06F 7/00
(52) U.S. Cl. ...................... 701/41; 340/439; 348/119; 180/168
(58) Field of Search ..................... 701/41, 23; 180/168, 180/167, 169, 141, 142; 340/439, 438, 435, 425.5; 348/119, 118; 342/113

(56) References Cited

U.S. PATENT DOCUMENTS

| | | | |
|---|---|---|---|
| 5,485,378 A | * 1/1996 | Franke et al. | 348/118 |
| 5,680,122 A | * 10/1997 | Mio | 180/167 |
| 5,708,427 A | * 1/1998 | Bush | 180/168 |
| 5,765,116 A | 6/1998 | Wilson-Jones et al. | 701/41 |
| 5,913,375 A | 6/1999 | Nishikawa | 180/168 |
| 5,979,581 A | 11/1999 | Ravani et al. | 180/168 |
| 6,005,492 A | * 12/1999 | Tamura et al. | 180/169 |
| 6,091,833 A | * 7/2000 | Yasui et al. | 348/118 |
| 6,178,365 B1 | * 1/2001 | Kawagoe et al. | 701/41 |
| 6,282,478 B1 | * 8/2001 | Akita | 303/125 |
| 6,308,123 B1 | * 10/2001 | Ikegaya et al. | 180/422 |
| 6,311,123 B1 | * 10/2001 | Nakamura et al. | 123/352 |
| 6,335,689 B1 | * 1/2002 | Mine | 180/272 |

FOREIGN PATENT DOCUMENTS

| | | | |
|---|---|---|---|
| EP | 0 527 665 | 2/1993 | |
| EP | 0 555 987 | 12/1996 | |
| EP | 1074903 | * 7/2001 | ............ G05D/1/03 |
| JP | 10-103935 | 4/1998 | |

* cited by examiner

*Primary Examiner*—William A. Cuchlinski, Jr.
*Assistant Examiner*—Olga Hernandez
(74) *Attorney, Agent, or Firm*—Foley & Lardner (57) ABSTRACT

An apparatus for vehicle lane following in which a look ahead sensor including a CCD camera and an image processor detects a lane marking on the surface of a roadway. The image processor estimates a lateral displacement of a point at a preview distance in front of a vehicle from a target line. The target line is a line between lane markings defining a lane. An electric motor coupled to the steering mechanism is used to provide a bias (a torque input) to the steering, which may either assist or oppose to the steering torque from the driver. A steering controller is designed to assist the driver to maintain the vehicle's lane position by holding the vehicle at the target line using a biasing torque if the lane following is selected by the driver. In order to reflect the driver preference in the lane following, the controller collects a sufficient number of measures of the vehicle lateral displacement when the lane following is not selected. Based on the collected data, the controller updates the target line position. In the subsequent lane following, the driver is assisted to maintain the vehicle at this updated target line.

8 Claims, 6 Drawing Sheets

LATERAL CONTROL OF VEHICLE FOR LANE FOLLOWING

FIELD OF THE INVENTION

The present invention relates generally to a driver assistance system for facilitating steering of a vehicle by tracking a target line on the surface of a roadway, and more particularly to a lateral control of a vehicle for lane-following system based on detection of lane markings (usually painted white or yellow lines) on the surface of a roadway.

BACKGROUND OF THE INVENTION

A number of technologies for lateral control by detection of lane markings have emerged. Some of such technologies are disclosed in U.S. Pat. No. 5,913,375, U.S. Pat. No. 5,765,116 and U.S. Pat. No. 5,979,581. In U.S. Pat. No. 5,913,375, a CCD camera mounted on a vehicle detects the presence of lane markings on a roadway and carries out a lateral control of a vehicle in relation to the detected lane marking. In U.S. Pat. No. 5,765,116, a video camera or a CCD camera is used to detect the presence of lane marking. An associated signal processor estimates the vehicle lateral position in relation to the detected lane markings. An electric motor coupled to the steering mechanism is used to provide a torque input to the steering. A controller is designed to assist the driver to maintain the vehicle lane position using a torque input to the steering. In U.S. Pat. No. 5,979,581, a laser sensor is used to detect three points on a painted lane marking on the surface of a roadway and three points are used to estimate the position of the lane centerline relative to the vehicle, as well as the geometry of the roadway.

JP-A 10-103935 discloses a technology to estimate a curve of a lane in a road constructed with a slope rising to the outside edge by correcting image from an image pick-up mounted on a vehicle. This technology is used to correctly estimate the lane centerline used for vehicle lateral control for lane following.

Most of these technologies rely on the lane centerline for lateral control of a vehicle. Some drivers may feel uneasy or uncomfortable being deviated from their favorite lane positions if they are guided toward the lane centerline. Therefore, a need remains for a new approach to the lateral control of vehicles, which allow drivers favorite lane positions. The present invention satisfies this need.

SUMMARY OF THE INVENTION

An object of the present invention is to provide an automated lane-following system, which allows drivers favorite lane positions.

According to one aspect of the present invention, there is provided a lane-following system of facilitating steering of a is vehicle by tracking a lane of a roadway, the vehicle having a steering system including a steering mechanism, said lane-following system comprising:

a sensor detecting the position of lane marking on the surface of a roadway in relation to the vehicle, said lane marking defining a lane of a roadway;

a signal processor operatively coupled to said sensor to estimate a lateral displacement of a point at a preview distance in front of the vehicle from the detected lane marking;

an actuator coupled to the steering mechanism to provide a steering bias to the steering system, which may either assist or oppose the steer torque from a vehicle driver, in response to a steering control signal;

a steering controller producing said steering control signal based on said estimated lateral displacement to assist the driver of the vehicle to maintain the vehicle at a target line within the lane using steering bias, said steering controller being operable, when the vehicle travels without lateral control for lane following, to collect said estimated lateral displacement to produce a lateral displacement data, said steering controller being operable to update the position of the target line using said lateral displacement data.

According to another aspect of the present invention, there is provided a method of facilitating steering of a vehicle by tracking a lane of a roadway, the vehicle having a steering system including a steering mechanism, said method comprising:

detecting the position of lane marking on the surface of a roadway in relation to the vehicle, said lane marking defining a lane of a roadway;

estimating a lateral displacement of a point at a preview distance in front of the vehicle from the detected lane marking;

producing a steering control signal based on said estimated lateral displacement to assist a driver of the vehicle to maintain the vehicle at a target line within the lane using a steering bias;

collecting, when the vehicle travels without lateral control for lane following, said estimated lateral displacement to produce a lateral displacement data; and updating the position of the target line using said lateral displacement data.

BRIEF DESCRIPTION OF THE DRAWINGS

The invention will be fully understood by reference to the following drawings, which are for illustrative purposes only.

DESCRIPTION OF THE PREFERRED EMBODIMENTS

Figure 1:
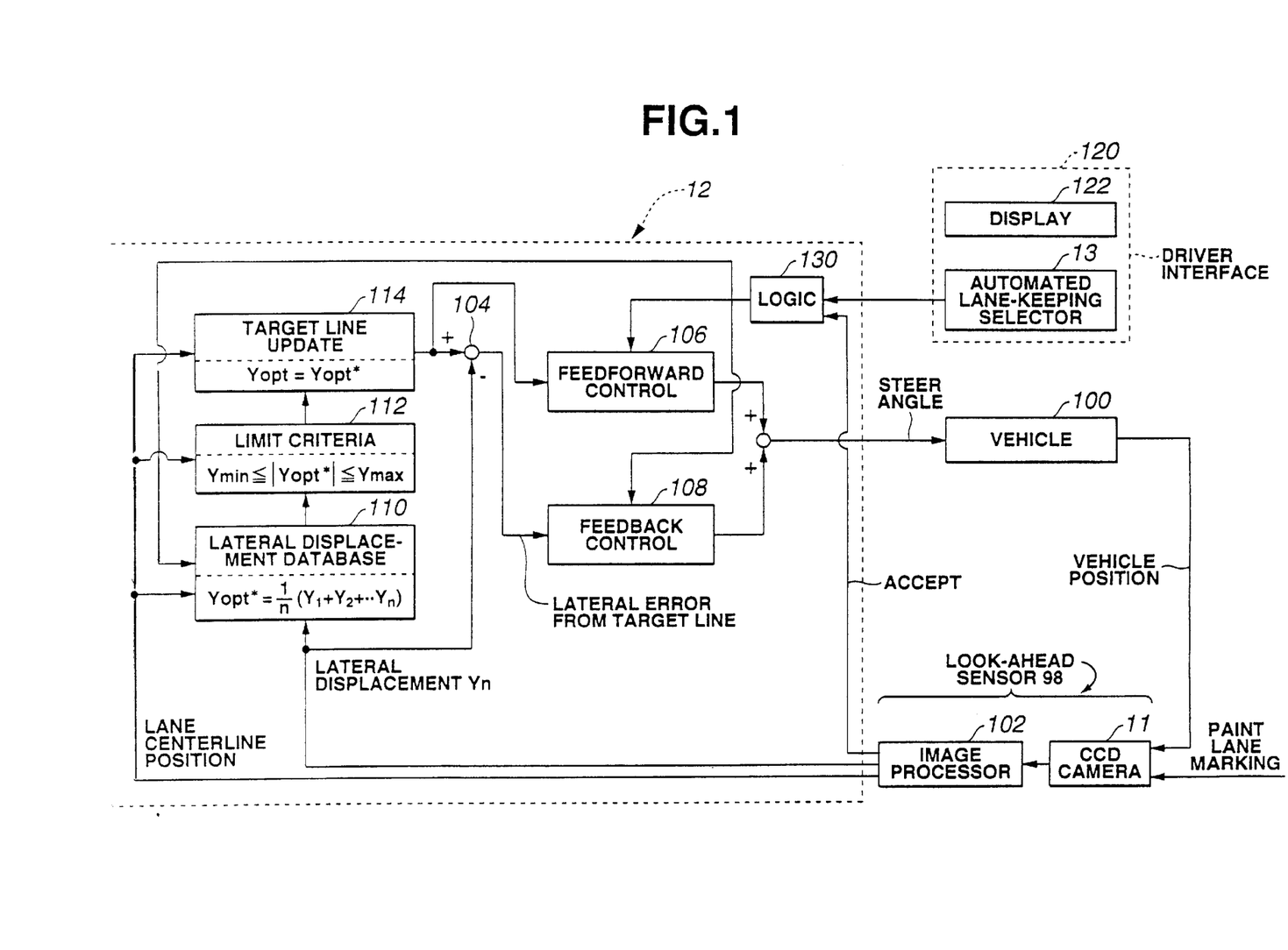
FIG. 1 is a functional block diagram of an automated lane-following system in accordance with the present invention.

For illustrative purposes, the present invention will be described with reference to FIG. 1 through FIG. 7, where like reference numerals denote like parts, and that the method may vary as to the steps and their sequences, without departing from the basic concept as described herein, Referring first to FIG. 1, a functional block diagram of an automated lane-following system employing the present invention is shown. The system comprises a look-ahead sensor 98 mounted on a vehicle 100, and a steering controller 12. The steering controller 12 comprises a feedforward control module 106, a feedback control module 108, a lateral displacement correction module 110, a limit criteria module 112, a target line update module 114, and a logic module 130. It will be appreciated from the discussion herein that steering controller 12 and each of the modules included therein would typically be implemented in software on a computer, but hardware and/or firmware implementations are also contemplated.

Look-ahead sensor 98 is a conventional system including a CCD camera 11 and an associated image processor 102. The CCD camera 11 is mounted on the vehicle, for example, in the middle of the bonnet or grille, or in the vicinity of the internal rear view mirror in order to detect the presence of lane markings on a roadway, for example the spaced white or yellow lines defining a lane. Image processor 102 acquires images from CCD camera 11 and estimates the position of a lane centerline in relation to the lane markings and the lateral displacement Yn of vehicle 100 inwardly of a lane from one of the lane markings. The estimated lane centerline and lateral displacement position signals are fed to steering controller 12 together with an "ACCEPT" signal. Image processor 102 monitors the image signals from CCD camera 11 and switches the "ACCEPT" signal between "1" level and "0" level. If look-ahead sensor 98 locates the lane markings, the "ACCEPT" signal is at the "1" level. The "ACCEPT" signal is otherwise at the "0" level. This "ACCEPT" signal is used in determining whether or not look-ahead sensor 98 has detected the lane markings.

The logic module 130 is designed to produce a two-level signal having a first level that allows automated steering control for lateral control and a second level that prohibits such automated steering control. This two-level signal from the logic module 130 are applied to feedforward and feedback control modules 106 and 108. In response to the first level of this two-level signal, feedforward and feedback control modules 106 and 108 are operative to perform their functions. In response to the second level of the two-level signal, feedforward and feedback control modules 106 and 108 are disabled. The two-level signal from logic module 130 are also applied to lateral displacement database, limit criteria and target line update modules 110, 112 and 114. In response to the first level of the two-level signal, these modules 110, 112 and 114 are disabled. These modules 110, 112 and 114 are operative to perform their functions when the second level of the two-level signal is present.

Feedforward control module 106 produces a feedforward steering term based on the target line from target line update module 114. The target line and the lateral displacement are fed to a summation point 104 to produce a lateral error between the lateral displacement from the target line. Feedback control module 108 produces a feedback steering term based on the lateral error from summation point 104. The feedforward and feedback terms combine to produce a steering control signal for the desired front steering angle, which is sent to a steering actuator (not shown in FIG. 1) on vehicle 100.

Steering controller 12 responds to the signals from look-ahead sensor 98 and produces a steering control signal of greater or lesser magnitude to provide, in turn, a greater or smaller bias to the steering system depending upon the lateral error of the vehicle from the target line. The actuator coupled to the steering mechanism is used to provide a torque input to the steering which may either assist or oppose the steering torque from the vehicle driver.

The steering bias applied by the lane-following system can be switched on and off by the use of an automated lane-following selector switch 13 on a driver interface 120 that may have a display 122.

The lane-following system is first switched on by operation of selector switch 13 and display 122 indicates that this has occurred. The system then searches the lane markings. While the system is doing this, the message on display 122 reads "searching". As soon as the system locates the lane markings, display 122 indicates "accept". If the lane marking is lost, display 122 returns "searching" until it again locates the lane marking with display 122 returning to "accept".

Logic module 130 in response to the "ACCEPT" signal monitors whether or not look-ahead sensor 98 has detected lane markings. If the "ACCEPT" signal is at "1" level, it is determined that detection of lane marking is present. If it is at "0" level, detection of lane markings is absent. Logic module 130 monitors also the position of selector switch 13. It holds the two-level signal at its first level in response to presence of detection of "ACCEPT" signal when selector switch 13 is turned on. The two-level signal assumes its second level when selector switch 13 is turned off.

Figure 4:
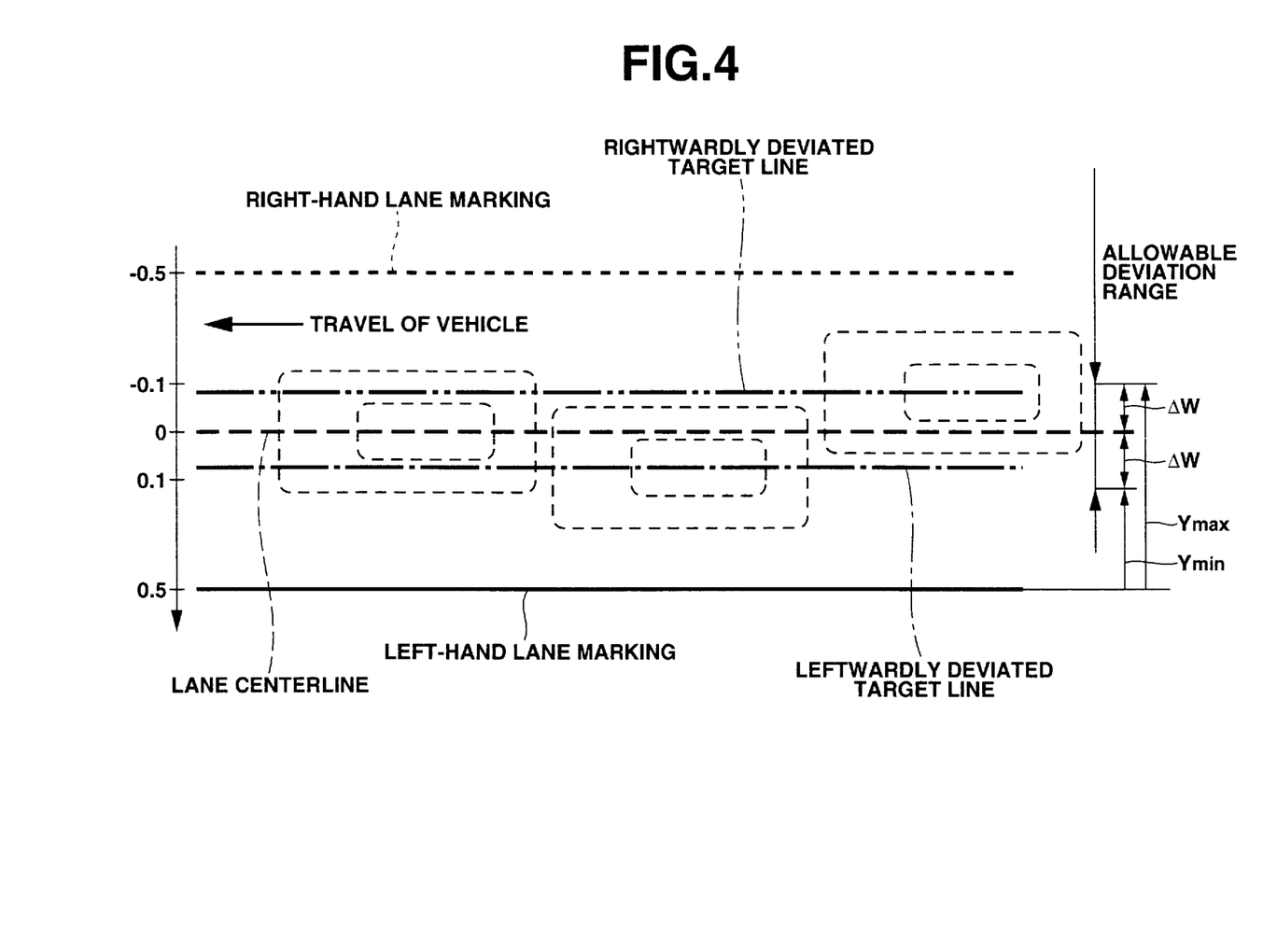
FIG. 4 is a plan view of a lane defined by lane markings, illustrating the operation of the present invention.

Referring to FIG. 4, image processor 102 acquire image signals from CCD camera 11 and estimates the position of a lane centerline between left-hand and right-hand lane markings in terms of a lateral distance from the left-hand lane marking. Image processor 102 estimates also a lateral displacement from the left-hand lane marking of a point Yn at a preview distance in front of a vehicle.

Let us now consider the case where a driver wishes to be guided along the lane centerline. In this case, immediately after the drive switches on lane-following system through selector switch 13, the lane centerline is set as the target line that is tracked by the vehicle.

Let us now consider the case where a driver tends to steer a vehicle by tracking a leftwardly deviated line from the lane centerline or rightwardly deviated line from the lane centerline as the best lane position. The lane-following system according to the present invention can learn such a deviated line by collecting lateral displacement at number of times when the driver travels on a roadway by tracking a lane at his best lane position. The deviated line given by the learning is set as a target line for the subsequent vehicle lateral control got lane following.

Referring again to FIG. 1, in a lateral displacement collection mode when selector switch 13 is turned off, lateral displacement database module 110 is operative to collect lateral displacement Yn from image processor 102 at a number of times within a predetermined period or time To and determines average Yopt* that can be expressed as:

$$Yopt^* = 1/n(Y1+Y2+ \ldots +Yn).$$

Figure 5:
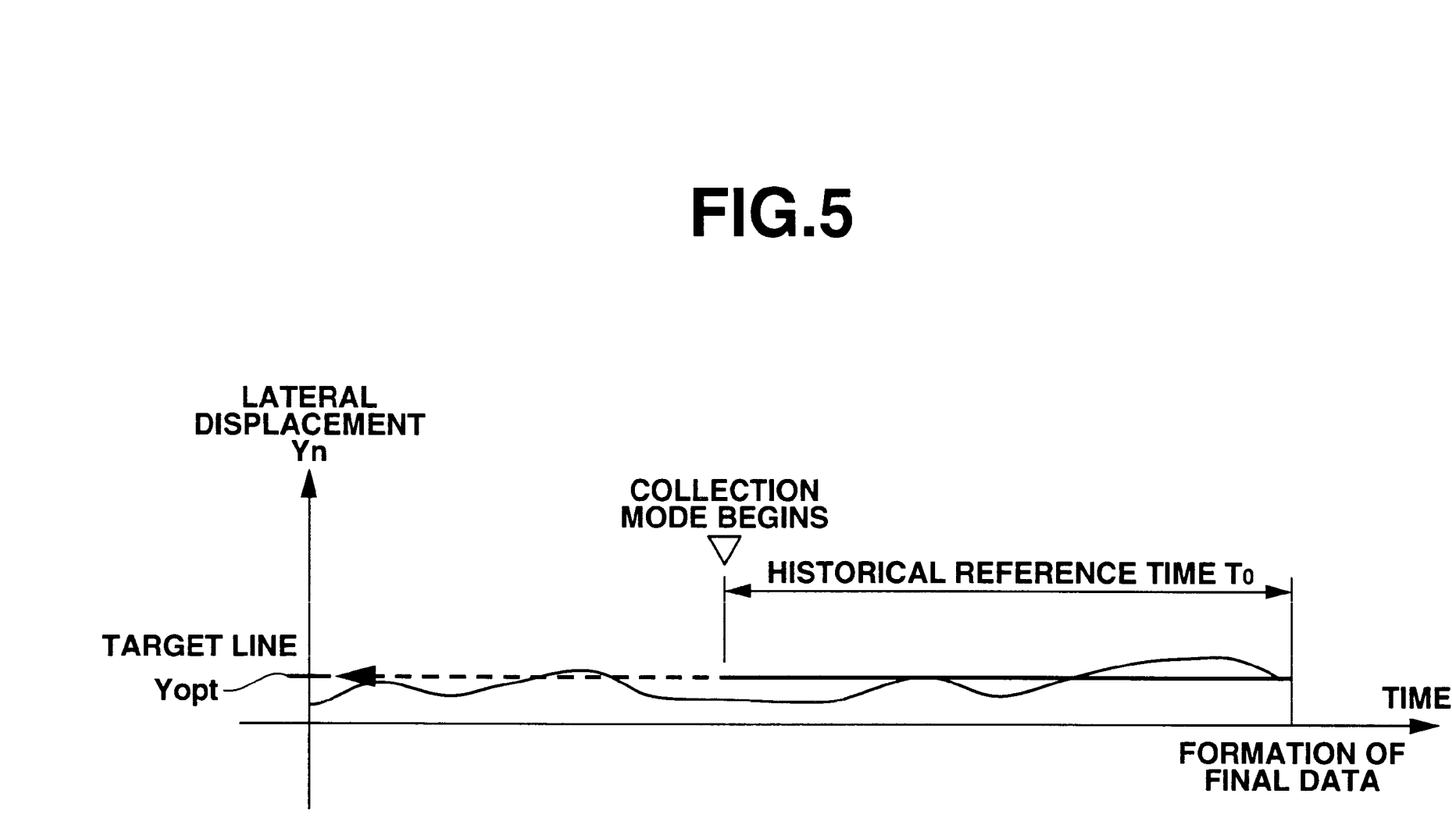
FIG. 5 is a timing diagram illustrating the operation of the present invention.

The absolute value Yopt* is confined to a predetermined window around the estimated lane centerline at limit criteria module 112. Referring to FIG. 5, lateral displacements Ymax and Ymin define the boundary of the window. If the estimated lane centerline is expressed in terms of a lateral displacement Yc, Ymax and Ymin can be expressed as:

$$Ymax = Yc + \Delta W,$$

$$Ymin = Yc - \Delta W,$$

where: $\Delta W$ is an allowable deviation from Yc.

Thus, estimated lateral centerline Yc determines Ymax and Ymin. At limit criteria module 112, Ymax is set as Yopt* if $|Yopt^*| > Ymax$, while Ymin is set as Yopt* if $|Yopt^*| < Ymin$.

The average Yopt* as modified is set to target line update module 114. At target line update module 114, target line Yopt is updated with Yopt* from limit criteria module 112.

From the preceding description, it is understood that a leftwardly or rightwardly deviated target line may be set during lateral control for lane keeping as illustrated in FIG. 5, so that a driver can take his/her lane position.

Figure 2:
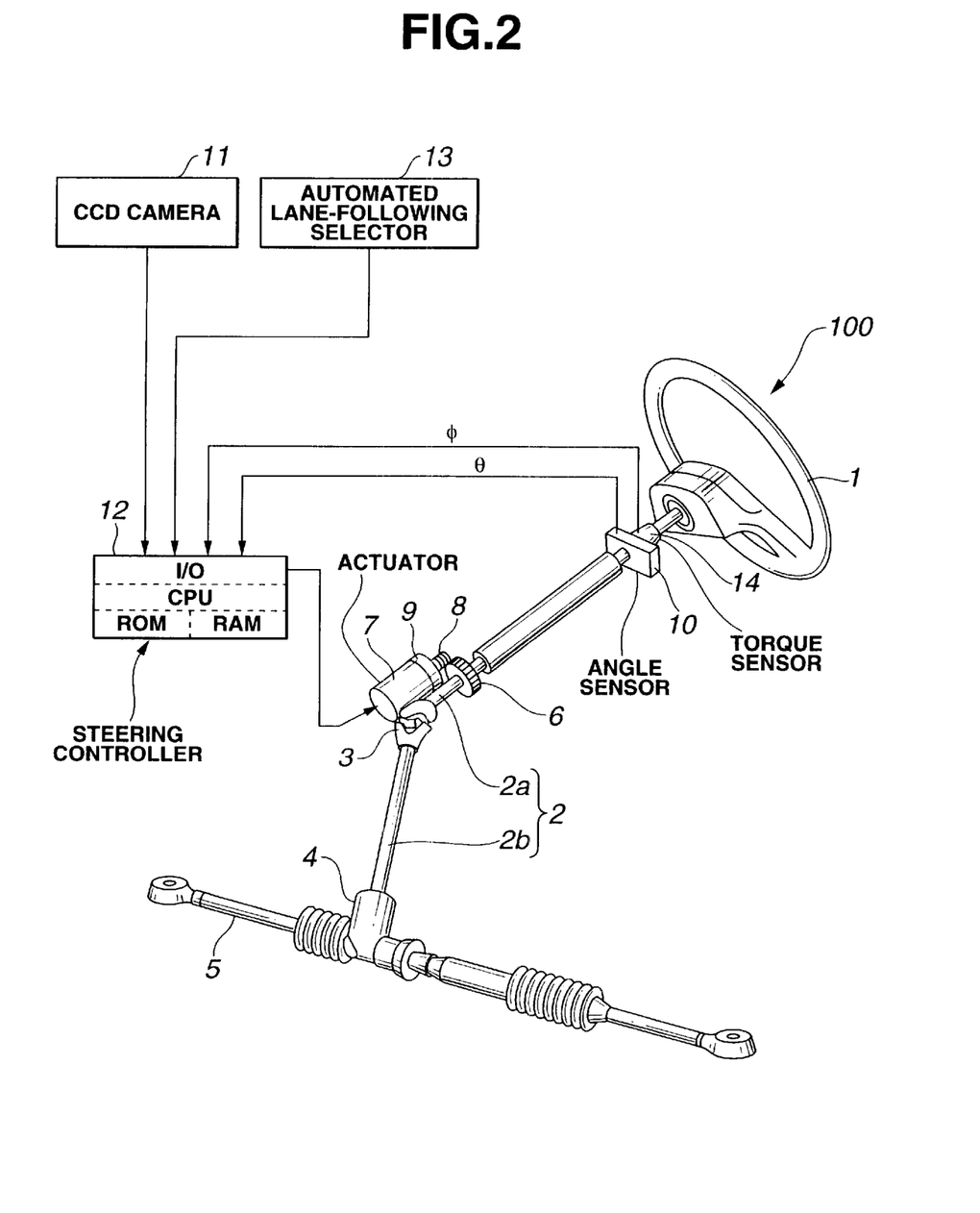
FIG. 2 is a diagrammatic view of a hardware configuration of an automated lane-following system in accordance with the present invention.

FIG. 2 illustrates an automated lane-following system according to the present invention. The reference numeral 100 designates a vehicle having a steering system. A steering wheel 1 is connected for unitary rotation with an upper shaft 2a of a steering shaft 2. A lower shaft 2b is coupled with upper shaft 2a via a universal joint 3. Within a rack and pinion type steering gear box 4, lower shaft 2b has, at its lower end, a pinion, not shown, which is in meshing engagement with a pair of side rods 5 that are operatively connected with front right and left road wheels, respectively.

A wheel gear 6 is fixedly coupled with upper shaft 2a at a portion near its lower end. An actuator in the form of a motor 7 is mounted adjacent upper shaft 2a and has a worm 8 in meshing engagement with wheel gear 6. An electromagnetic clutch 9 is disposed between motor 7 and worm 8. A drive of motor 7 is transmitted to worm 8 to apply steer bias to the steering system.

A steer angle sensor 10, which is attached to an upper portion of upper shaft 2a, detects angular position of upper shaft 2a relative to its neutral position. It generates a steer angle signal θ indicative of the detected angular position. Steer angle signal θ is fed to a steering controller 12, which is a conventional microcomputer based control unit including, as usual, a central processor unit (CPU), a random access memory (RAM), a read only memory (ROM), an input output device (I/O) and an internal clock. The CPU, RAM, ROM and I/O are interconnected by data bus. Controller 12 shown in FIG. 2 is substantially the same as its counterpart in FIG. 1, but it performs the function of the image processor 102 of FIG. 1.

Steering controller 12 has an actual steer angle calculation module implemented in software and stored in the ROM. Using this software, the CPU derives actual steer angle θd from angular displacement θ and steering gear ratio. Image signals from a CCD camera 11 are fed to controller 12. CCD camera 11 is mounted on a vehicle 100 in the vicinity of the internal rear view mirror in order to detect the presence of lane markings on a roadway. Controller 12 has an image processor module implemented in software and stored in the ROM. Using this software, controller 12 estimates the position of a lane centerline in relation to the lane markings and the lateral displacement Yn of vehicle 100 from one of the lane markings. The position of the lane centerline is expressed in terms of a lateral displacement from the lane marking. Controller 12 monitors the image signals from CCD camera 11 and sets an "ACCEPT" signal at "1" level if CCD camera 11 locates the lane markings. Controller 12 sets the "ACCEPT" signal at "0" level if CCD camera 11 loses or is searching the lane markings.

A torque sensor 14, such as disclosed in EP 0 555 987 B1, comprises a compliant element in the upper portion of upper shaft 2a in the vicinity of steer angle sensor 10 in order to detect torsional angle φ of upper shaft 2a either optically or inductively. The detected torsional angle φ represents driver input torque through steering wheel 1. A signal indicative of the detected torsional angle φ is fed to controller 12. Controller 12 has an actual steer torque calculation module implemented in software and stored in the ROM. Using this software, controller 12 derives actual steer torque Td from torsional angle φ.

The lane-following system can be switched on and off by a driver through an automated lane-following selector switch 13. When the lane-following system is switched on, controller 12 keeps on determining a target value in operation parameter such as steer torque or steer angle. If steer torque is used as the operation parameter, steer angle sensor 10 and the actual steer angle calculation module may be omitted. In this case, controller 12 determines a target steer torque Tr based on the estimated position of target line and the lateral displacement from the lane marking. It produces a steering control signal of magnitude to provide, in turn a torque input to the steering which may assist or oppose the steering torque from the driver, whereby the actual steer torque Td approaches the target steer torque Tr. In response to the steering control signal, electric current passing through motor 7 is regulated to provide such torque input to the steering. If steer angle is used as the operation parameter, torque sensor 14 and the actual steer torque calculation module may be omitted. In this case, controller 12 determines a target steer angle Topt in response to the position of target line and the lateral displacement from the lane marking. It determines a steering control signal In response to the steering control signal, motor 7 provides a torque input to the steering which may either assist or oppose the steering torque from the driver, such that a deviation of actual steer angle θd from target steer angle Topt approaches zero.

Figure 3:
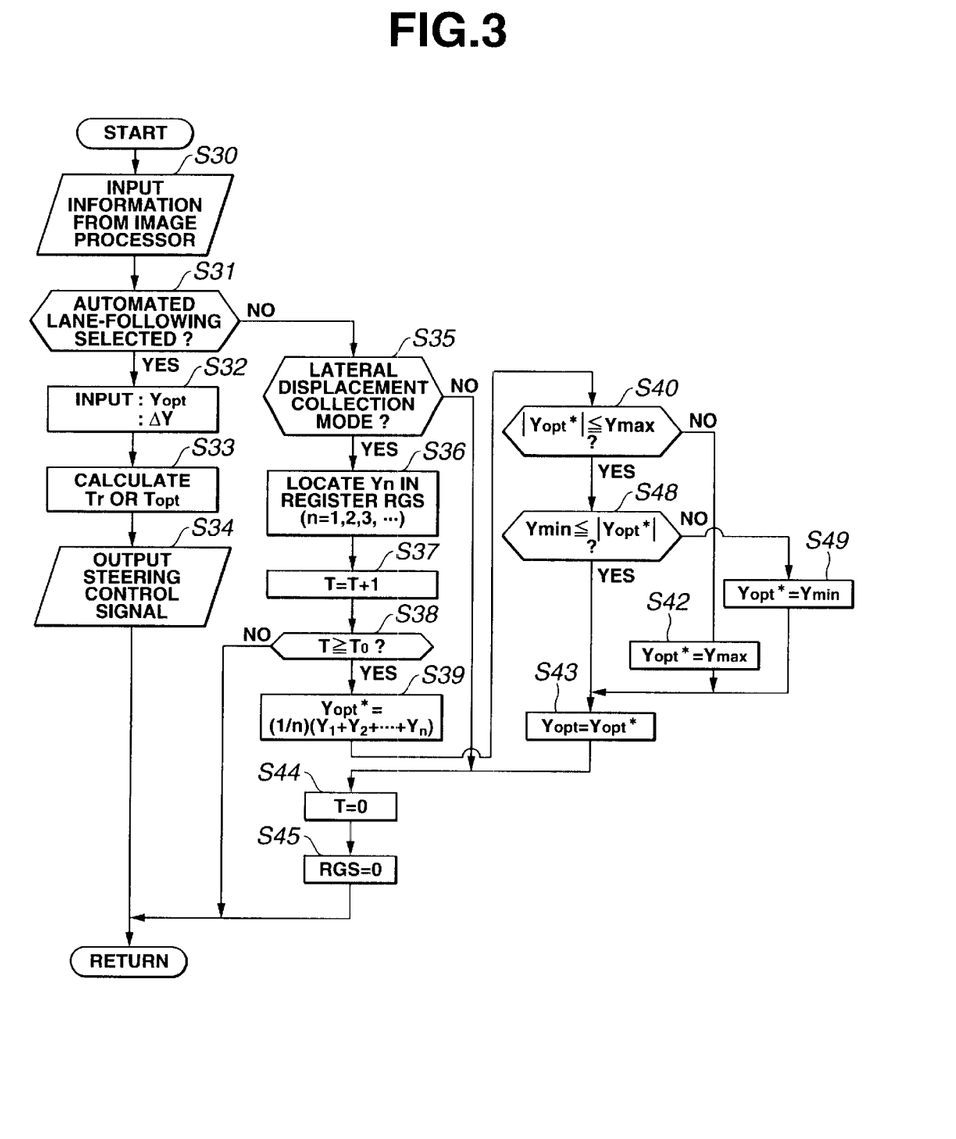
FIG. 3 is a flow chart of a control routine implementing the present invention.

The flow chart of FIG. 3 is a control routine implementing the present invention.

At step S30, the CPU inputs information from the signal processor module. The information includes lane centerline position between lane markings defining a lane, lateral displacement Yn from one lane marking and "ACCEPT" signal.

At step S31, the CPU determines whether or not automated lane-following selector switch 13 is turned on. If switch 13 is turned on, at step S31, the routine proceeds to step S32. If, at step S31, the switch 13 is turned off, the routine proceeds to step S35.

At step 32, the CPU inputs a target line Yopt, that is expressed in terms of a lateral position from the lane marking, out of a target line memory, and it inputs a target deviation ΔY out of a target deviation memory.

At the next step S33, the CPU determines a target value in operation parameter of the steering system, such as a target steer torque Tr and a target steer angle Topt, in such a direction as to reduce an error between lateral displacement Yn and the target line (Yopt+ΔY) toward zero.

At step S33, the CPU determines and outputs a steering control signal indicative of current passing through electric motor 7. Motor 7 provides a torque input to the steering in response to the electric current in such a manner as to bring actual steer torque Td into agreement with target steer torque Tr or actual steer angle θd into agreement with target steer angle Topt.

If, at step S31, the CPU determines that selected switch 13 is turned off, the routine proceeds to step S35. At step S35, the CPU determines whether or not the vehicle travels in a lateral displacement collection mode.

Based on the recognition that lane positions selected by different drivers will not differ appreciably upon passing through a curve of a roadway, one standard of judgment, which may be used at step S35, is whether or not a radius of curve of the estimated lane centerline is sufficiently great. In other words, it is judged whether or not a roadway is generally straight. Other standard of judgment is whether or not yaw rate angle is less than a predetermined angle.

If, at step S35, the CPU determines that the vehicle travels in the lateral displacement travels in the lateral displacement collection mode, the routine proceeds to step S36. At step S36, the CPU stores current lateral displacement Yn (n=1, 2, 3, . . . ) in a lateral displacement memory RGS.

At next step 537, the CPU increases the content of timer T by one (T=T+1).

At step S38, the CPU determines whether or not timer T is greater than a predetermined time value To.

As long as T<To at step S38 and the interrogation at step S35 is affirmative, the CPU repeats operation to store lateral displacement Yn in lateral displacement memory RGS. Thus, lateral displacement memory RGS collects or stocks lateral displacement data.

If, at step S35, the CPU determines that the vehicle travels outside of the lateral displacement collection mode. The routine proceeds to step S44 and then to step S45. At step S44, the CPU resets timer T equal to zero (T=0). At step 545, the CPU clears lateral displacement memory RGS (RGS=0) before returning to START point.

If, at step 538, the CPU determines that T is greater than or equal to To (T≧To), the routine proceeds to step S39. At step 539, the CPU inputs all of the lateral displacement data Y1, Y2,+ . . . +Yn from the lateral displacement memory and determines an average Yopt* by calculating the following equation:

$$Yopt^* = (1/n)(Y1+Y2+ \ldots +Yn).$$

Next, the routine proceeds to step S40. At step S40, the CPU determines whether or not the absolute value of Yopt* is less than or equal to a predetermined maximum Ymax. If this is the case, the routine proceeds to step S48. At step S48, the CPU determines whether or not the absolute value of Yopt* is greater than or equal to a predetermined minimum Ymin. If this is the case, the routine proceeds to step S43. At step 543, the CPU updates the target line Yopt stored in the target line memory with Yopt*. Referring to FIG. 4, the predetermined maximum and minimum Ymax and Ymin define limits of an allowable deviation range from the estimated lane centerline. In this example, the predetermined maximum and minimum Ymax and Ymin can be expressed as, $$Ymax = Yc + \Delta W,$$

$$Ymin = Yc - \Delta W,$$

where: Yc is lateral displacement of lane centerline, and ΔW is maximum deviation.

If |Yopt*|>Ymax, the interrogation at step S40 results in negative and the routine proceeds to step S42. At step S42, the CPU sets Ymax as Yopt* before the routine proceeds to step S43. If |Yopt*|<Ymin, the interrogation at step S48 results in negative and the routine proceeds to step S49. At step S49, the CPU sets Ymin as Yopt* before the routine proceeds to step S43.

After the CPU has overwritten the target line Yopt at step S43, the routine proceeds to steps 44 and 45 before returning to START point.

[Automated Steering During Lateral Control for Lane Following]

If selector switch 13 is turned on to select lateral control for lane following, a flow along steps S30, S31, S32, S33 and S34 is repeated. At step S34, the CPU outputs steering control signal. In response to this steering control signal, electric current passing through motor 7 is regulated. Motor 7 provides lo a torque input to the steering in such a direction as to bring actual steer torque Td into agreement with target steer torque or actual steer angle θd into agreement with target steer angle Topt. In this manner, the vehicle is guided toward the target line.

[Updating Target Line]

Learning is conducted to obtain preferred lane position taken by a driver to provide a target line reflecting the driver's preferred lane position. This target line is used to overwrite the preceding target line. Subsequently, lateral control using this new target line is conducted.

Leaning is initiated after driver has turned off selector switch 13. In this case, the interrogation at step S31 stays negative, allowing the routine to proceed along steps S35, S36, S37 and S38 as long as T<To and the lateral displacement collection mode is satisfied. Lateral displacement Yn is stored in lateral displacement memory RGS. This operation is repeated until T becomes equal to or greater that To. If, at step S38, it is determined that T≧To, the routine proceeds to step S39 and then to step S43. At step S43, the CPU overwrites the existing target line with a new target line created based on the data obtained at step S39.

[Conditions Permitting Rewriting Target line]

It is not that lateral displacement is always collected for producing a new target line when selector switch 13 is turned off. Unless the lateral displacement collection mode is accomplished (see step S35), the lateral displacement is not collected even when selector switch 13 is turned off (see step S31).

At step S35, what may be required as standard for judgment is whether or not a radius of curve of a roadway is sufficiently great. If the radius of curve of the roadway is sufficiently great, indicating that the roadway is generally straight, lateral displacement is stored for producing a new target line.

FIG. 5 illustrates variation of lateral displacement Yn collected for a historical reference time To immediately after the lateral displacement collection mode has begun. The average Yopt* of these lateral displacement data is used to rewrite target line Yopt.

Individual favorite lane positions by drivers are not reflected when a vehicle travels along a curve. Lateral displacement obtained during such travelling condition are not used in producing a target line. Accordingly, rewritten target line Yopt correspond to individual favorites of drivers.

[Allowable Deviation Range of Target Line]

Referring to FIG. 4, rewritten target line is confined within the allowable deviation range from the lane centerline between lane markings. This may be confirmed by reviewing steps S40, S42, S48 and S49 in FIG. 3. In the example of FIG. 4, the maximum deviation ΔW is 0.1 if the width of a lane is 1.0.

Accordingly, excessive deviation from the lane centerline is prohibited.

Figure 6:
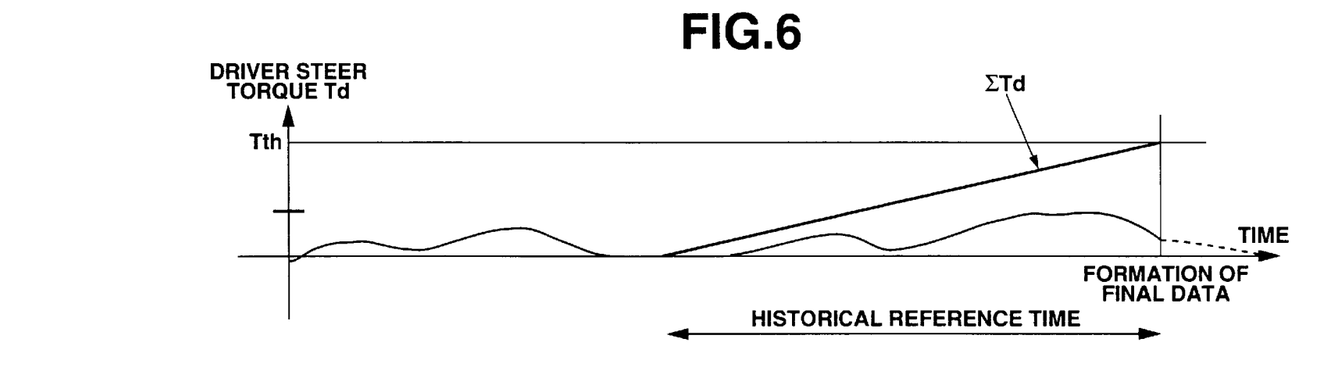
FIG. 6 is a timing diagram illustrating the operation of the present invention.
Figure 7:
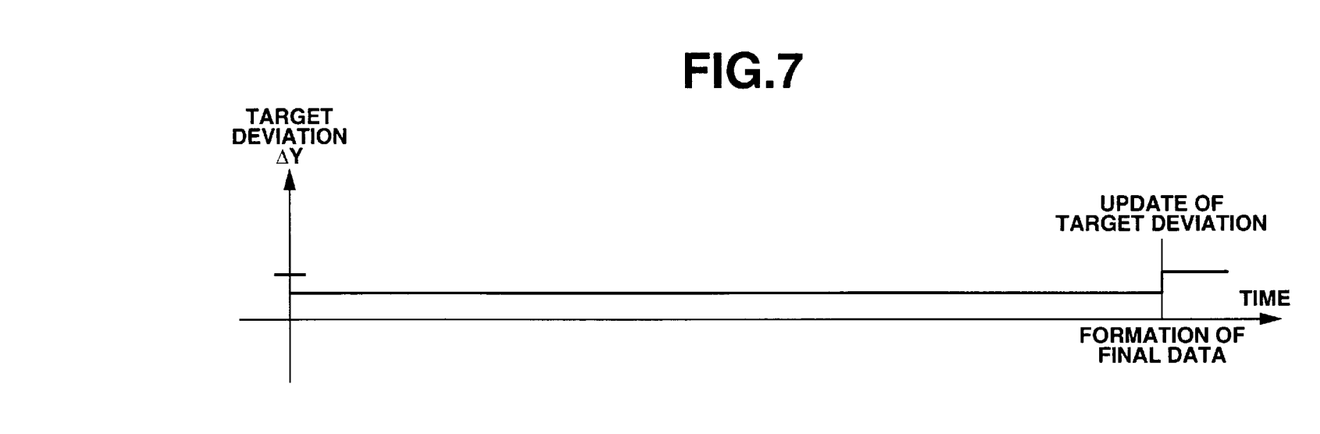
FIG. 7 is a timing diagram illustrating the operation of the present invention.

FIGS. 6 and 7 illustrate another feature that may be added to the preceding embodiment illustrated in FIGS. 2 to 5. According to this feature, driver steering torque from Td is always detected during lateral control for lane following. Immediately after a torque data collection mode has been accomplished when a vehicle travels on a generally straight roadway, time integral ΣTd of detected driver steering torque Td is calculated. This calculation continues for a historical reference time until ΣTd exceeds a preset threshold value Tth. Upon elapse of the historical reference time, the average of steering torque data obtained during the historical reference time is calculated. Target deviation Δ is altered upon elapse of the historical reference time (see FIG. 7) in such a direction as to reduce the calculated average of steering torque toward zero.

In this manner, during lateral control for lane following, updating ΔY causes a reduction in driver steering torque needed to hold a vehicle at a target line. As a result, should the driver release the steering wheel, the vehicle will be held at the driver favorite lane position.

In the example of FIGS. 6 and 7, the driver steering torque Td is used. The driver steering torque may be replaced with steering control signal. In this case, the average of steering control signal data collected during a historical reference time is calculated. Upon elapse of the historical reference time, the target deviation ΔY is updated in such a direction as to reduce the calculated average of steering control signal data toward zero.

In this manner, during lateral control for lane following, updating ΔY causes a reduction in driver steering torque needed to hold a vehicle at a target line. As a result, should the driver release the steering wheel, the vehicle will be held at the driver favorite lane position.

What is claimed is:

1. A lane-following system of facilitating steering of a vehicle by tracking a lane of a roadway, the vehicle having a steering system including a steering mechanism, said lane-following system comprising:
    sensor means for detecting a position of lane marking on the surface of a roadway in relation to the vehicle, said lane marking defining a lane of a roadway;
    means operatively coupled to said sensor means to estimate a lateral displacement of a point at a preview distance in front of the vehicle from the detected lane marking;
    an actuator coupled to the steering mechanism to provide a steering bias to the steering system, which may either assist or oppose a steer torque from a vehicle driver, in response to a steering control signal;
    steering controller means for producing said steering control signal based on said estimated lateral displacement to assist the driver of the vehicle to maintain the vehicle at a target line within the lane using the steering bias,
    said steering controller means being operable, when the vehicle travels without lateral control for lane following, to collect said estimated lateral displacement to produce lateral displacement data,
    said steering controller means being operable to update a position of the target line using said lateral displacement data.

2. A method of facilitating steering of a vehicle by tracking a lane of a roadway, the vehicle having a steering system including a steering mechanism, said method comprising:
    detecting a position of lane marking on the surface of a roadway in relation to the vehicle, said lane marking defining a lane of a roadway;
    estimating a lateral displacement of a point at a preview distance in front of the vehicle from the detected lane marking;
    producing a steering control signal based on said estimated lateral displacement to assist a driver of the vehicle to maintain the vehicle at a target line within the lane using a steering bias;
    collecting, when the vehicle travels without lateral control for lane following, said estimated lateral displacement to produce lateral displacement data; and
    updating a position of the target line using said lateral displacement data.

3. A lane-following system of facilitating steering of a vehicle by tracking a lane of a roadway, the vehicle having a steering system including a steering mechanism, said lane-following system comprising:
    a sensor detecting a position of lane marking on the surface of a roadway in relation to the vehicle, said lane marking defining a lane of a roadway;
    a signal processor operatively coupled to said sensor to estimate a lateral displacement of a point at a preview distance in front of the vehicle from the detected lane marking;
    an actuator coupled to the steering mechanism to provide a steering bias to the steering system, which may either assist or oppose the steer torque from a vehicle driver, in response to a steering control signal;
    a steering controller producing said steering control signal based on said estimated lateral displacement to assist the driver of the vehicle to maintain the vehicle at a target line within the lane using the steering bias,
    said steering controller being operable, when the vehicle travels without lateral control for lane following, to collect said estimated lateral displacement to produce lateral displacement data,
    said steering controller being operable to update a position of the target line using said lateral displacement data.

4. The lane-following system as claimed in claim 3, wherein, when the vehicle travels without lateral control for lane following, said steering controller is operable to determine whether or not a current traveling condition of the vehicle is appropriate for collecting said estimated lateral displacement for production of said lateral displacement data, and wherein said steering controller is operable, when it is determined that the current traveling condition of the vehicle is appropriate for collecting said estimated lateral displacement for production of said lateral displacement data under condition where the vehicle travels without lateral control for lane following, to collect said estimated lateral displacement data within a historical reference time to provide said lateral displacement data, and wherein said steering controller is operable to calculate an average of said lateral displacement data based on said estimated lateral displacement collected within said historical reference time.

5. The lane-following system as claimed in claim 4, wherein said steering controller is operable to determine whether or not a deviation of a roadway from straightness is less than a predetermined magnitude.

6. The lane-following system as claimed in claim 3, wherein said steering controller is operable to limit a difference between the position of the target line and the position of the lane centerline within a predetermined window set around the lane centerline.

7. The lane-following system as claimed in claim 3, further comprising a torque sensor detecting steer torque from a driver of the vehicle,
    wherein, during lateral control for lane following, said steering controller is operable to update a target deviation from said target line upon elapse of a historical reference time in such a manner as to reduce the average of steer torque data collected within said historical reference time toward zero.

8. The lane-following system as claimed in claim 3, wherein, during lateral control for lane following, said steering controller is operable to update a target deviation from said target line upon elapse of a historical reference time in such a manner as to reduce the average of the steering control signal data collected within said historical reference time toward zero.

* * * * *